United States Patent [19]

Shekleton et al.

[11] Patent Number: 4,794,754
[45] Date of Patent: Jan. 3, 1989

[54] LOW COST ANNULAR COMBUSTOR

[75] Inventors: Jack R. Shekleton; Douglas C. Johnson; Melvin K. Lafferty, all of San Diego, Calif.

[73] Assignee: Sundstrand Corporation, Rockford, Ill.

[21] Appl. No.: 65,258

[22] Filed: Jun. 22, 1987

[51] Int. Cl.⁴ .............................................. F02C 3/14
[52] U.S. Cl. .................................... 60/39.36; 60/739; 60/760
[58] Field of Search ................ 60/39.36, 739, 746, 60/755, 756, 757, 758, 759, 760

[56] References Cited

U.S. PATENT DOCUMENTS

| | | | |
|---|---|---|---|
| 3,116,408 | 1/1964 | Wasika | 60/39.36 |
| 3,335,567 | 8/1967 | Hemsworth | 60/739 |
| 3,548,565 | 12/1970 | Toesca | 60/39.36 |
| 3,736,746 | 6/1973 | Dobell et al. | 60/737 |
| 3,937,013 | 2/1976 | Aspinwall | 60/39.36 |
| 4,549,402 | 10/1985 | Saintsbury et al. | 60/760 |

*Primary Examiner*—Louis J. Casaregola
*Attorney, Agent, or Firm*—Wood, Dalton, Phillips, Mason & Rowe

[57] ABSTRACT

The expense of fabricating an annular combustor for use with a small diameter gas turbine engine is minimized in a construction including a bell-shaped housing 52, an axially extending sleeve 66 within the housing 52, an annular liner 74 within the housing 52 and about the sleeve 66 and including inner, outer and radial walls 80, 76, 78, respectively, spaced from the sleeve 66 and the housing 52 and all being formed of sheet metal. A circular fuel manifold 108 with angularly spaced fuel dispensing openings 122 is disposed between the housing 52 and the outer wall 76 and a plurality of open ended, elongated tubes 112 extend through the outer wall 76 and are in fluid communication with respective openings 122 in the fuel manifold 108 to introduce air and fuel generally tangentially into the liner 74.

19 Claims, 3 Drawing Sheets

LOW COST ANNULAR COMBUSTOR

FIELD OF THE INVENTION

This invention relates to novel aerothermodynamic design annular combustors for use in gas turbine engines, and more particularly, to such annular combustors that may burn "difficult" fuels such as diesel oils as well as relatively easy fuels, such burning to occur at very high heat release rates in a very small volume, which may be manufactured very inexpensively and/or which are suited for use as part of gas turbine engines in environments that require extremely small engine diameters.

BACKGROUND OF THE INVENTION

Most relatively small missiles in use today are propelled by solid fuel rockets as opposed to, for example, turbojet engines. The selection of a solid fuel rocket as a propulsion device has been largely dictated by two factors. First, in many instances, a turbine engine cannot be fabricated sufficiently economically as to compete with a solid fuel rocket engine. Secondly, in small size missiles, i.e., those having relatively small diameter on the order of about six inches, it is heretofore been quite difficult to manufacture an efficient turbojet engine that would fit within the six inch envelope required of the propulsion unit for such a missile.

As a consequence of the use of solid fuel rocket engines, some degree of control of the missile flight path or trajectory is lost over that which would be available were it possible to propel the missile by a gas turbine engine whose output can be readily varied. Further, even if the gas turbine engine operates relatively inefficiently, the use of such an engine greatly extends the range of the missile.

The difficulty in economically producing small diameter gas turbine engines resides not so much in the manufacture of the compressor and/or turbine section of the engine, but rather, is more apt to be attributable to the labor intensive nature of the manufacture of the combustor. Furthermore, as combustor sizes shrink to fit within some desired small envelope as the six inch envelope of a relatively small missile mentioned previously, the difficulty in achieving efficient combustion of fuel rises asymptotically. In particular, as the size or volume of a combustor is reduced, there may be insufficient volume to allow the fuel to be first vaporized completely, burned efficiently, and then mixed uniformly.

The present invention is directed to overcoming one or more of the above problems.

SUMMARY OF THE INVENTION

It is the principal of the invention to provide a new and improved gas turbine engine that may be economically manufactured and/or may be fitted within an unusually small envelope. More specifically, it is an object of the invention to provide a new and improved combustor of inexpensive construction and which, though of unusually small volume, promotes both full and efficient vaporization and combustion of fuel, and thorough mixing for uniform exit temperature to a turbine wheel.

According to one facet of the invention, there is provided an annular combustor for a gas turbine including a bell-shaped housing defining an axis. A toroidal lining having inner and outer annular walls is located within the housing and is spaced therefrom to define a radially outer compressed air inlet between the housing and the liner and axially elongated compressed air annulus between the housing and the outer wall and a radially extending compressed air annulus in fluid communication with the axially elongated annulus oppositely of the inlet. The liner further includes a generally axially facing annular outlet between the walls and just radially inwardly of the inlet.

A typically circular fuel injection manifold is disposed in the axially elongated annulus and has a plurality of angularly spaced, generally axially directed openings through which fuel may flow. A plurality of tubular nozzles extend through the outer wall to enter the space between the walls generally tangentially thereto. Each of the nozzles includes an air inlet within the axially elongated annulus and a fuel inlet aligned with an associated one of the openings in the fuel manifold.

The invention further contemplates that the liner have a generally radial wall interconnecting the inner and outer walls opposite of the annular outlet.

According to one embodiment of the invention, there are a plurality of air openings in the outer wall adjacent the radial wall for directing compressed air in the axially elongated annulus into the liner and against the radial wall.

The invention also contemplates that there be a plurality of air openings in the radial wall adjacent the inner wall for directing compressed air in the radial annulus into the liner and against the inner wall.

In a highly preferred embodiment, there are air openings in both the outer wall and the radial wall as mentioned previously.

To achieve low cost, in a preferred embodiment, the housing and outer and radial walls are stamped sheet metal and the air openings are punched holes.

In a preferred embodiment, the housing further includes a central sleeve within the inner wall of the liner to define a further axially elongated annulus which is in fluid communication with the radial annulus and which opens just inside the annular outlet to provide for cooling of the inner wall and the introduction of the dilution air at the annular outlet.

Preferably, the further axially elongated annulus is narrow in relation to the first mentioned axially elongated annulus to increase the velocity of air flowing therethrough and thereby enhance heat transfer at the inner wall.

Where the outer wall is formed of sheet metal, the same may be provided with a circumferential series of inwardly bent tabs directed toward the inlet to allow dilution air to enter the liner near the outlet.

The invention also contemplates that the nozzles be in the form of open ended tubes and that the manifold and the tubes be in side by side relation. The tubes have one end opening to the space between the outer wall and the housing and the other end opening to the space between the inner and outer liner walls and fluid communication between the openings in the manifold and the interior of the tubes is established by a hole in the side of each tube aligned with the associated fuel dispensing opening in the manifold.

Preferably, the manifold is located on the downstream side of the nozzles so as to minimize interference with air flow in the space between the liner and the housing.

In a preferred embodiment, a fuel line extends to the fuel manifold and the fuel line is wholly within the combustor between the housing and the outer wall to assist in minimizing the size of the gas turbine.

Other objects and advantages will become apparent from the following specification taken in connection with the accompanying drawings.

DESCRIPTION OF THE PREFERRED EMBODIMENT

Figure 1:
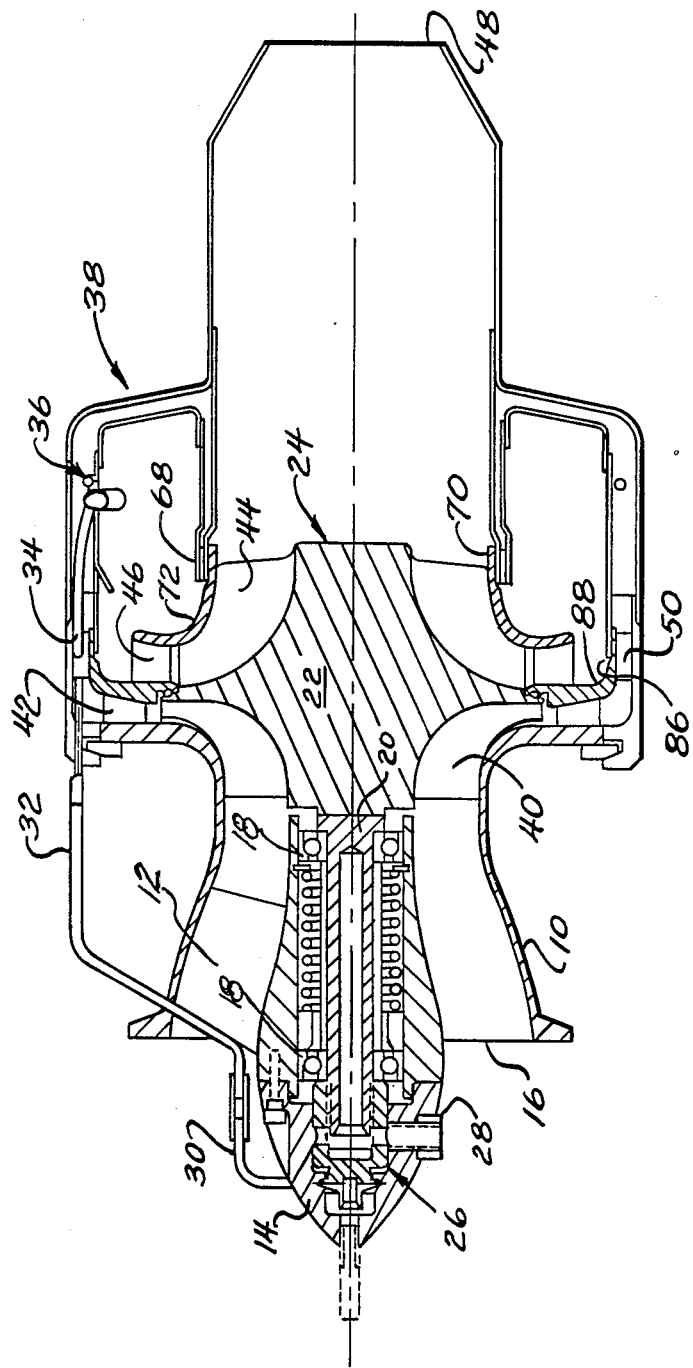
FIG. 1 is a sectional view of a gas turbine engine, specifically a turbojet engine, embodying an annular combustor made according to the invention.

An exemplary embodiment of a combustor made according to the invention is illustrated in a gas turbine engine in FIG. 1. The gas turbine engine is in the form of a turbojet and therefore performs work by the production of thrust. However, those skilled in the art will readily appreciate that the invention is applicable to other forms of gas turbine engines including those wherein the output power is taken from a rotating shaft.

In any event, the gas turbine engine includes an air inlet housing 10. A plurality of angularly spaced, radially inwardly directed struts 12 (only one of which is shown) stationarily mount a suitably aerodynamically configured housing 14 centrally within a circumferential inlet opening 16 on the housing 10. The housing 14 includes bearings 18 which journal a shaft 20 which is coupled to the hub 22 of a so-called monorotor, generally designated 24.

The shaft 20, within the housing 14, may be coupled to a fuel pump 26 of conventional construction having an inlet 28 and an outlet line 30.

The outlet line 30 passes up the leading edge of the strut 12 and then extends axially as shown at 32 to be connected to a section 34 which in turn extends to a fuel manifold generally designated 36, within an annular combustor, generally designated 38, and made according to the invention.

Returning to the rotor 24, on one side thereof, the same is provided with a plurality of compressor vanes 40 in fluid communication with the inlet 16 and which direct compressed air radially through a conventional diffuser 42. After passing through the diffuser, the compressed air is directed axially into an inlet for the combustor 38 as will be described in greater detail hereinafter.

On the side of the hub 22 opposite from the compressor vanes 40, the rotor 24 includes radial flow turbine blades 44. Hot gasses of combustion from the combustor 38 are directed against the blades 44 by a nozzle structure 46 to drive the rotor sufficiently as to compress the air necessary for turbine operation as well as to provide power for the fuel pump 26 and any other accessory systems that require it. The hot gasses of combustion then exit the machine via a jet nozzle 48 producing thrust in the process.

In most instances, so-called deswirl vanes 50 are interposed between the diffuser 42 and the inlet to the combustor 38. As is well know, the purpose of such vanes is to reduce the helical component of air flow from the diffuser 42.

Those skilled in the art will also appreciate that in many gas turbines, the geometry of the deswirl vanes corresponding to the vanes 50 may be quite complex in order to minimize the helical component of air flow.

However, according to the present invention, the deswirl vanes 50 may be relatively simple, and thus inexpensive, because unlike conventional art, a high degree of swirl within the combustor 38 is tolerated, and is indeed advantageous.

As alluded to generally previously, the combustor 38 of the present invention is not only intended to be inexpensive to manufacture, but is additionally intended to be ideally suited for use in environments having a small envelope for the gas turbine and burn all conceivable fuels. In this regard, in the description that follows, it should be appreciated that the structure is one that has actually been proved and wherein the outside diameter of the engine, including the combustor 38 is but a mere six inches, with an annulus height of about one inch.

Figure 2:
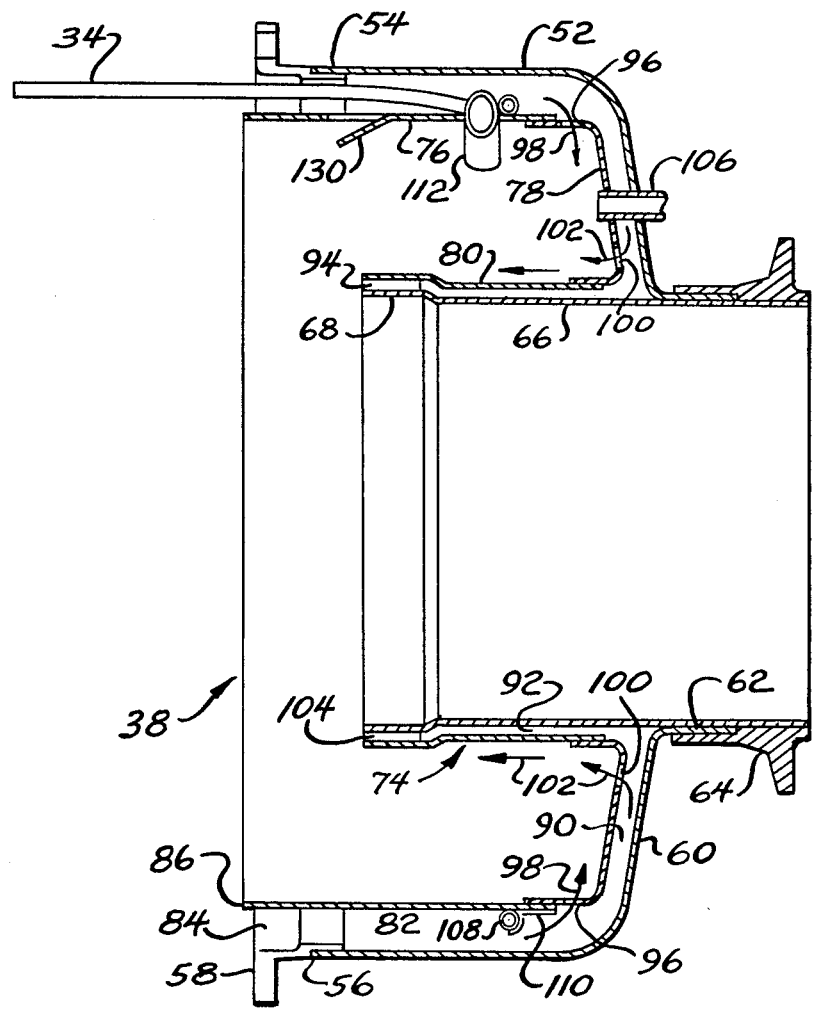
FIG. 2 is a sectional view of the combustor.

As best seen in FIG. 2, the combustor 38 includes a bell-shaped housing 52 having a cylindrical wall 54 terminating in an edge 56 receiving a ring 58 for mounting purposes. The cylindrical surface 54 merges with a generally radially inward directed surface 60 which in turn merges with a short, small diameter, axially extending cylindrical surface 62 which receives a mounting ring 64 for the jet nozzle 48.

A generally cylindrical sleeve 66 is fitted within the cylindrical section 62 and secured thereto. The sleeve 66 extends substantially toward but not to the mounting ring 58 to terminate in a slightly enlarged end 68 which, as seen in FIG. 1, is adapted to be received on the open end 70 of an annular casting 72 joined with the nozzle structure 48.

Disposed within the bell-shaped housing 52 and in spaced relation to the same as well as the sleeve 66 is a liner, generally designated 74. The liner 74 includes a cylindrical, radially outer wall 76 joined to a generally radially extending wall 78 which in turn is joined to a radially inner wall 80. As can be discerned from FIG. 2, the walls 76, 78 and 80 are separate pieces which are suitably joined together. In this connection, according to a preferred embodiment of the invention, and to achieve economy of construction, the walls 76, 78 and 80 of the liner 74 as well as the bell-shaped housing 52 and the sleeve 66 are all formed of sheet metal as by stamping or the like.

The disposition of the liner 74 within the bell-shaped housing 52 as mentioned previously results in an axially elongated annular space 82 which terminates adjacent the mounting ring 58 in an annular compressed air inlet opening 84. In this connection, an end 86 of the radially outer wall 76 of the liner 74 is adapted to fit against a stationary casting 88 which is interposed between the diffuser 42 and the nozzle 46 to seal against the same. Thus, compressed air from the diffuser 42, after passing by the deswirling vanes 50, is directed into the annulus 82 between the bell housing 52 and the radially outer wall 76.

A radially elongated annulus 90 in fluid communication with the annulus 82 exists between the radial wall 78 of the liner 74 and the surface 60 of the bell-shaped housing 52. This annulus 90 in turn merges with a very narrow, axially elongated radially inner annulus 92 defined by a space between the sleeve 66 and the radially inner wall 80 of the liner 74. To maintain concentricity between the sleeve 66 and the wall 80, adjacent the end 68, the liner 74 mounts a plurality of spacers 94. The spacers 94 engage, and are secured to the enlarged end 68 of the sleeve 66 and the enlarged end of sleeve 80 allowing relative movement between the components due to thermal forces.

At circumferentially spaced locations about the radially outer wall 76 of the liner and immediately adjacent the radial wall 78, the former is provided with a plurality of punched holes 96. Air flowing in the annulus 82 may enter the holes 96 and sweep as a film along the interior side of the radial wall 78 for cooling purposes. The air flow is indicated by arrows 98. Of course, additional cooling of the radial wall 78 will be accomplished by air flowing in the radial annulus 90.

Near the radially inner periphery of the radial wall 78, the same is provided with a series of punched openings 100 allowing compressed air from the radial annulus 90 to enter the interior of the liner 74 and flow in a film-like fashion along the interior surface of the inner wall 80 as indicated by arrows 102, also for cooling.

Such air that continues flowing in the annulus 90 past the openings 100 will enter the annulus 92. Because of the extremely narrow width of the annulus 92, such air will have to increase its velocity to flow therethrough. The increased velocity will, of course, mean an increased Reynolds Number and Nusselt number which, of course, will enhance heat transfer at the radially inner wall 80.

The just described structure effectively provides external convective cooling supplemented by rudimentary film cooling to avoid undesirable thermal gradients that reduce life. At the same time the structure allows the maintenance of relatively high liner temperature which, in conjunction with the cooling air, acts to minimize carbon deposition thereon.

As will be appreciated by those skilled in the art, the means employed to achieve such cooling are inexpensive. The low cost of the structure for such cooling is facilitated by the unique aerothermodynamic design of the combustor to be described in greater detail hereinafter. Tests of the combustor have demonstrated blue-flame combustion with the resulting low radiation heat input to the walls of the liner 74 thus making the just described cooling feasible.

After cooling the radially inner wall 80, the air exits an annular opening 104 to thoroughly and effectively mix with combustion gas within the interior of the combustor 74 and act as dilution air.

At one location, an axially directed tube 106 extends through both the housing 52 and the radial wall 70 to the interior of the liner 74. The tube 106 may be fitted with any suitable igniter or pyrotechnic device for the purpose of initiating combustion within the liner 74.

Figure 3:
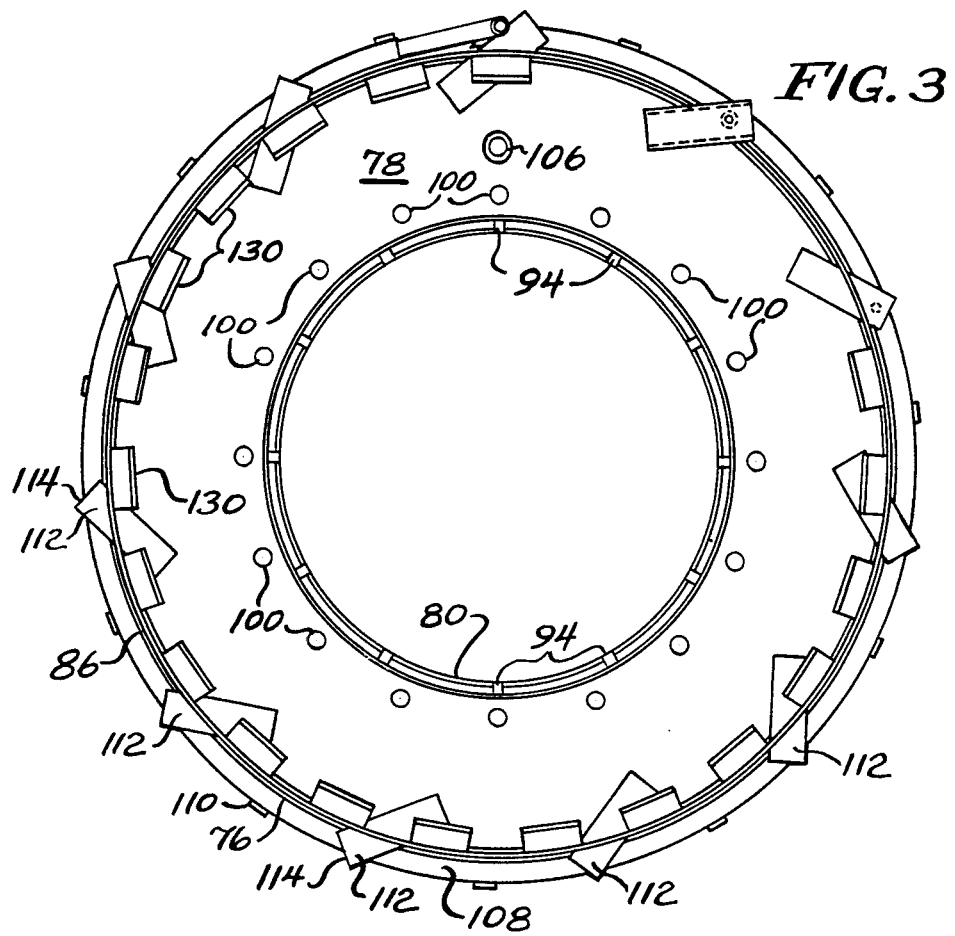
FIG. 3 is an end view of a linear used in the combustor.

As seen in FIGS. 2 and 3, the fuel manifold is a circular fuel conduit 108 extends peripherally about the outer wall 76 of the liner 74. A series of brackets 110 secure the manifold 108 in a plane transverse to the axis of the combustor 38.

At a plurality of angularly spaced locations, open ended tubes 112, which serve as nozzles, extends through the outer wall 76 of the liner 74. In the illustrated embodiment, eleven of the tubes 112 are employed. Those skilled in the art will appreciate that greater or lesser numbers could be used as desired.

The tubes each have one open end 114 within the annulus 82 and directed so as to open toward the oncoming flow of air. That is to say, the tubes 112 have their open ends 114 directed so as to allow the swirling air within the annulus 82 to enter the tubes 112 without appreciably changing direction. Though not shown, the ends 114 may be flared to reduce pressure losses at this location.

The opposite open ends 116 of the tubes 12 are disposed within the interior of the liner 74 and it will be appreciated from FIG. 3 that the axes of the tubes 112 are generally tangential to the space between the inner and outer walls 76 and 80 of the liner 74. It will also be appreciated from FIG. 2 that the axis of each tube 112 lie in a plane transverse to the axis of the combustor 38 and immediately adjacent the plane occupied by the fuel conduit 108.

Figure 4:
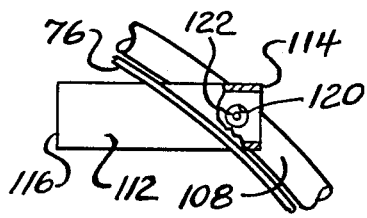
FIG. 4 is an enlarged, fragmentary view of a portion of a fuel manifold and nozzle construction utilized in the invention.
Figure 5:
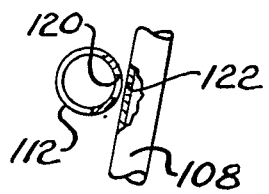
FIG. 5 is a fragmentary, enlarged view of the nozzle and fuel manifold taken from another direction.

Turning to FIGS. 4 and 5, each of the tubes 112 is provided with a circular opening 120 in its side wall near the end 114. The opening 120 is aligned with a corresponding small opening 122 in the fuel conduit 108. Preferably, the openings 122 are formed by any drilling process so that their dimension can be readily controlled according to the desired fuel flow and so that each opening 122 will be relatively uniform with respect to the other openings 122. At the same time, however, it has been recognized that this type of injector is significantly more tolerant of "sloppy" holes than conventional injectors.

As a result of this configuration, fuel from the conduit 108 will be injected through the openings 122 and 120 into the interior of each of the tubes 112. Compressed air passing through the tubes 112 and entering the liner 74 in a tangential direction will cause rapid evaporation of the fuel followed by combustion thereof within the liner 74. Because the path of movement of both fuel and combustion air within the liner 74 has a relatively high tangential component, the fuel and air remain in the liner 74 for a sufficiently long time as to promote both efficient vaporization and full combustion, notwithstanding the fact that the outer diameter of the liner 74 is less than six inches and an annulus height of one inch.

It should be noted that the fuel conduit 108 could be on either side of the tubes 112 if desired. However, it is preferable to locate the conduit 108 on the downstream side of the tubes 112 since there will be a lesser volume of air flowing within the annulus 82 at that location as a fair volume of the air entering the inlet 84 will be diverted from the annulus 82 into the tubes 112 themselves. Thus, at the downstream location, the conduit 108 will cause a lesser interference with the flow of air about the liner 74.

In this respect, because a fair degree of swirl in the annulus 82 is desired, the fuel line 34 may have a partially helical configuration to minimize interference with the swirling air as it emerges from the deswirl vanes 50.

Figure 6:
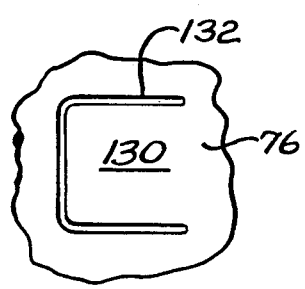
FIG. 6 is an enlarged, fragmentary view of a dilution air inlet to the combustor.
Figure 7:
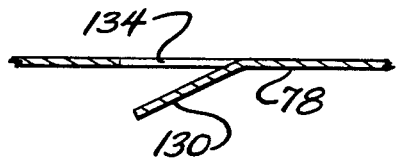
FIG. 7 is a sectional view of the dilution air inlet.

The radially outer wall 76 of the liner 74 is also provided with a circumferential series of inwardly bent tabs 130. The tabs 130 are located between the tubes 112 and the end 86 and serve to admit dilution air to the interior of the liner 74 from the annulus 82. As best seen in FIG. 6, each of the tabs 130 is formed by punching a U-shaped slot 132 at the desired location in the outer wall 76 and then bending the tab inwardly to form an opening 134 as seen in FIG. 7. As can be seen in FIG. 2, the radially innermost end of each of the tabs 130 is directed toward the end 86 of the liner wall 76.

From the foregoing, it will be appreciated that a combustor made according to the invention has a number of extraordinary features and/or provides a number of advantages. The use of high inlet air swirl allows the use of minimal deswirl vanes 50 to minimize cost. Furthermore, the high swirl promotes circumferential mixing of fuel and combustion air within the liner 74 while the high velocity from swirl provides for inexpensive convective cooling of the wall of the liner without the need for expensive cooling strips.

The addition of dilution air is achieved simply and inexpensively through the use of inexpensive punched out dilution air ports.

Fuel injection is achieved through inexpensive tangentially oriented tubes which act as atomizing air jets. Metering orifices for fuel are made reliable and uniform through the relatively inexpensive mediums of drilling.

The use of punched holes at strategic locations in the liner provides film-like cooling of the liner wall while the use of the spacers 94 permit both radial and axial thermal growth to occur without stressing components.

The described air flow patterns further allow an extremely small overall diameter and annulus height for the annular combustor. In this regard, it has been found that an annular combustor made according to the invention has achieved in engine testing a more than 30% increase in thermal loading over state of the art annular combustors (to $1776 \times 10^4$ BTU/ft$^3$ atm).

The efficient combustion achieved in a construction made according to the invention provides for a desirable smokeless exhaust and yet the combustor can be manufactured sufficiently economically as to have, if desired, a "throw away" capability. That is to say, the combustor may be used with cost effectiveness but once as, for example, in a gas turbine engine propelling a missile.

Thus, the invention provides an annular combustor that is both low cost and ideally suited for use in environments requiring a small envelope. As a consequence, it is ideally suited for use as part of a gas turbine engine employed in propelling relatively small missiles and may be used with efficacy in other environments as well.

We claim:

1. An annular combustor for a gas turbine comprising:
   a bell-shaped housing defining an axis:
   an annular liner having inner and outer annular walls within said housing and spaced therefrom to define a radially outer compressed air inlet between said housing and said liner, an axially elongated compressed air annulus between said housing and said outer wall and a radially extending compressed air annulus in fluid communication with said axially elongated annulus oppositely of said inlet, said liner further including a generally axially facing annular outlet between said walls and just radially inward of said inlet;
   a typically circular fuel injection manifold in said axially elongated annulus and having a plurality of angularly spaced, generally axially directed openings through which fuel may flow; and
   a plurality of typically tubular nozzles extending through said outer wall to enter the space between said walls generally tangentially thereto, each said nozzle including an air inlet within said axially elongated annulus and a fuel inlet aligned with an associated one of said openings.

2. The annular combustor of claim 1 wherein said liner further includes a generally radial wall interconnecting said inner and outer walls opposite of said annular outlet.

3. The annular combustor of claim 2 further including a plurality of air openings in said outer wall adjacent said radial wall for directing compressed air in said axially elongated annulus into said liner and against said radial wall.

4. The annular combustor of claim 2 further including a plurality of air openings in said radial wall adjacent said inner wall for directing compressed air in said radial annulus into said liner and against said inner wall.

5. The annular combustor of claim 2 further including a plurality of first air openings in said outer wall adjacent said radial wall for directing compressed air in said axially elongated annulus into said liner and against said radial wall and a plurality of second air openings in said radial wall adjacent said inner wall for directing compressed air in said radial annulus into said liner and against said inner wall.

6. The annular combustor of claim 5 wherein said outer and radial walls are stamped sheet metal and said air openings are punched holes.

7. The annular combustor of claim 1 wherein said housing further includes a central sleeve within said inner wall to define a further axially elongated annulus in fluid communication with said radial annulus and opening just inside said annular outlet to provide for cooling of said inner wall and the introduction of dilution air at said annular outlet.

8. The annular combustor of claim 7 wherein said further axially elongated annulus is narrow in relation to said axially elongated annulus to increase the velocity of air flowing therethrough and thereby enhance heat transfer at said inner wall.

9. The annular combustor of claim 1 wherein said outer wall is formed of sheet metal and between said inlet and said nozzles includes a circumferential series of inwardly bent tabs directed toward said inlet to allow dilution air to enter said liner near said outlet.

10. An annular combustor for a gas turbine comprising:
    a bell-shaped housing having an axis;
    an axially extending sleeve within said housing;
    an annular liner within said housing and about said sleeve, said liner having concentric inner and outer, annular axially elongated walls respectively spaced from said sleeve and said housing and a radially extending end wall interconnecting said inner and outer walls at one end thereof;
    said housing, said sleeve and said inner, outer and end walls being formed of sheet metal;
    a circular fuel manifold with angularly spaced fuel dispensing openings and disposed between said housing and said outer wall and located in a first plane transverse to said axis;
    a plurality of open ended elongated tubes in said outer wall and adjacent said manifold, said tubes lying in a second plane parallel to said first plane and being directed generally tangential to the space between said inner and outer walls, one end of each tube being located in said space and the other end of each tube being located between said housing and said outer wall; there being one tube for each said fuel dispensing opening; and means establishing fluid communication between each fuel dispensing opening and the interior of its associated tube.

11. The annular combustor of claim 10 wherein said manifold and said tubes are in side by side relation and said establishing means comprises a hole in the side of each tube and aligned with the associated fuel dispensing opening.

12. The annular combustor of claim 10 wherein said first plane is closer to said end wall than said second plane.

13. The annular combustor of claim 10 further including a fuel line extending to said fuel manifold, said fuel line being wholly between said housing and said outer wall.

14. The annular combustor of claim 10 further including a plurality of air openings in said outer wall adjacent said radial wall for directing compressed air in said housing into said liner and against said radial wall.

15. The annular combustor of claim 10 further including a plurality of air openings in said radial wall adjacent said inner wall for directing compressed air in said housing annulus into said liner and against said inner wall.

16. The annular combustor of claim 10 further including a plurality of first air openings in said outer wall adjacent said radial wall for directing compressed air in said housing into said liner and against said inner wall and a plurality of second air openings in said radial wall adjacent said inner wall for directing compressed air in said housing into said liner and against said inner wall.

17. The annular combustor of claim 10 wherein said outer and radial walls are stamped sheet metal and said air openings are punched holes.

18. An annular combustor for a gas turbine comprising:
- a bell-shaped housing having an axis;
- an axially extending sleeve within said housing;
- an annular liner within said housing and about said sleeve, said liner having concentric inner and outer, annular axially elongated walls respectively spaced from said sleeve and said housing and a radially extending end wall interconnecting said inner and outer walls at one end thereof;
- said housing, said sleeve and said inner, outer and end walls being formed of sheet metal;
- means for introducing fuel to be burned into said liner in a generally tangential direction at a plurality of circumferentially spaced locations;
- a first series of punched holes in said outer wall adjacent said radial wall to cause air to enter the liner and sweep as a film across said radial wall; and
- a second series of punched holes in said radial wall near said inner wall to allow air to enter the liner and flow in a film-like fashion along said inner wall.

19. The annular combustor of claim 18 wherein said sleeve and said inner wall are closely spaced to force air passing therethrough to flow at high velocity to thereby provide enhanced cooling of said inner wall.

* * * * *